(12) United States Patent
White et al.

(10) Patent No.: US 11,483,977 B2
(45) Date of Patent: Nov. 1, 2022

(54) GRAIN LOSS PREVENTION SYSTEM USING AIR BLOWERS

(71) Applicant: DEERE & COMPANY, Moline, IL (US)

(72) Inventors: Matthew R. White, Geneseo, IL (US); Corwin M. Puryk, Bettendorf, IA (US); Daniel S. Hoffman, Bettendorf, IA (US); Justin C. Freehill, Fenton, IL (US); Shreyas Modak, Maharashtra (IN); Bryan R. Yanke, Eldridge, IA (US)

(73) Assignee: DEERE & COMPANY, Moline, IL (US)

( * ) Notice: Subject to any disclaimer, the term of this patent is extended or adjusted under 35 U.S.C. 154(b) by 192 days.

(21) Appl. No.: 16/734,501

(22) Filed: Jan. 6, 2020

(65) Prior Publication Data

US 2021/0204479 A1 Jul. 8, 2021

(51) Int. Cl.
*A01D 75/00* (2006.01)
*A01D 61/02* (2006.01)

(52) U.S. Cl.
CPC ............ *A01D 75/00* (2013.01); *A01D 61/02* (2013.01)

(58) Field of Classification Search
CPC ........ A01D 75/00; A01D 61/02; A01D 41/14; A01D 43/077; A01D 12/46; A01D 41/12; A01D 57/00
See application file for complete search history.

(56) References Cited

U.S. PATENT DOCUMENTS 1,900,269 A * 3/1933 Altgelt ................. A01D 61/008
56/12.9
2,670,586 A * 3/1954 Phillips .................. A01D 57/10
56/158

(Continued)

FOREIGN PATENT DOCUMENTS

DE 102015110746 A1 * 1/2017 ............. A01D 57/20
WO 2017005343 A1 1/2017

OTHER PUBLICATIONS

Crary Air Reel, http://www.crary.com/Products/Crary_Air_Reel/Crary_Air_Reel, publicly available as early as Jan. 2020, 3 pages.

(Continued)

*Primary Examiner* — Arpad Fabian-Kovacs
(74) *Attorney, Agent, or Firm* — Taft Stettinius & Hollister LLP; Stephen F. Rost

(57) ABSTRACT

A harvesting head for a collection machine that harvests material. The head includes conveyor belts to transport material towards the collection machine, and blower heads to help prevent material from falling off the conveyor belts. The conveyor belts can include a feed belt that feeds material towards the collection machine, and a side belt that carries material towards the feed belt. Blower heads can blow across the side belt and towards the center of the feed belt. Blower heads can be located below the side belt. Blower heads can be located near the front of the feed belt and blow towards the collection machine. A feed drum can move material towards the collection machine, and blower heads can blow across the feed drum and towards the feed belt or collection machine. Blower heads can be movable, or have adjustable flow rate, velocity, direction or spread.

15 Claims, 6 Drawing Sheets

(56) References Cited

U.S. PATENT DOCUMENTS

| | | | | |
|---|---|---|---|---|
| 2,718,744 A * | 9/1955 | Phillips | | A01D 57/10 56/158 |
| 2,734,331 A * | 2/1956 | Phillips | | A01D 57/10 56/296 |
| 2,737,006 A * | 3/1956 | Klingler | | A01D 57/10 56/158 |
| 2,780,046 A * | 2/1957 | Edwards | | A01D 57/10 56/158 |
| 2,832,187 A * | 4/1958 | Johnson | | A01D 41/1252 56/207 |
| 3,165,874 A * | 1/1965 | Osteen | | A01D 57/10 56/12.9 |
| 3,193,995 A * | 7/1965 | Miller | | A01D 41/14 56/12.9 |
| 3,555,790 A * | 1/1971 | Quick | | A01F 12/10 56/12.8 |
| 4,303,373 A * | 12/1981 | Polhemus | | A01D 45/30 415/206 |
| 4,406,112 A * | 9/1983 | Brooks | | A01D 57/10 56/12.9 |
| 4,866,919 A * | 9/1989 | Brooks | | A01D 57/10 56/12.9 |
| 4,936,082 A * | 6/1990 | Majkrzak | | A01D 57/02 56/220 |
| 6,085,510 A * | 7/2000 | McDonnell | | A01D 57/10 56/12.9 |
| 7,591,127 B1 | 9/2009 | Stacer et al. | | |
| 9,462,750 B2 * | 10/2016 | Cavkusic | | A01D 57/01 |
| 9,814,180 B2 * | 11/2017 | Busser | | A01D 45/021 |
| 10,098,280 B2 * | 10/2018 | Busser | | A01D 41/06 |
| 2009/0199529 A1 * | 8/2009 | Schroeder | | A01D 57/10 56/12.9 |
| 2012/0190414 A1 * | 7/2012 | Cressoni | | A01D 45/021 460/29 |
| 2018/0359921 A1 * | 12/2018 | Brimeyer | | A01D 41/14 |
| 2019/0029176 A1 * | 1/2019 | Yanke | | A01D 34/22 |

OTHER PUBLICATIONS

AWS Airbar, https://www.awsairbar.com/, publicly available as early as Jan. 2020, 4 pages.

Geringhoff draper head, Flex, TruFlex and TruFlex Razor, https://www.geringhoff.com/en_us/Products/Draper-Heads/TruFlex-TruFlex-Razor/p/gp_TruFlex, publicly available as early as Jan. 2020, 11 pages.

Geringhoff Integrated Air System, https://www.geringhoff.com/en_us/Products/Draper-Heads/Integrated-Air-System/p/gp_IntegratedAirSystem, publicly available as early as Jan. 2020, 6 pages.

* cited by examiner

GRAIN LOSS PREVENTION SYSTEM USING AIR BLOWERS

FIELD OF THE DISCLOSURE

The present disclosure relates to combines, and more specifically to using air blowers to reduce grain loss from combine conveyor belts.

BACKGROUND

Combines are used to harvest crops in a field and often use a cutting and/or harvesting head, for example a draper head, to increase the swath cut in a single pass by the combine. As the crops are cut by the head, side belts can carry the cut material to a central feed area of the combine where the cut material is processed and collected. During this transport of cut material to the central feed area and/or during transfer of cut material from the side belts to the central feed area, grain can fall on the ground and be lost from the harvest. It would be desirable to have a grain loss prevention system that helps keep the grain from falling on the ground and being lost to the harvest.

SUMMARY

A harvesting head is disclosed for a collection machine that harvests and stores material, where the harvesting head includes one or more conveyor belts and one or more blower heads. The one or more conveyor belts are configured to transport the material towards the collection machine. The one or more blower heads are configured to help prevent the material from falling off the plurality of conveyor belts as the material is transported towards the collection machine.

The conveyor belts can include a feed belt that feeds the material towards the collection machine, and a side belt that carries the material towards the feed belt. The feed belt can have two sides and a center halfway between the two sides. One or more of the blower heads can blow air across the side belt and towards the center of the feed belt. The one or more blower heads can be located below the side belt and blow air towards the center of the feed belt. The feed belt can have a front and a rear, where the front is further from the collection machine than the rear. One or more of the blower heads can be located near the front of the feed belt and blow air towards the rear of the feed belt.

The harvesting head can also include a feed drum configured to rotate and move the material towards the collection machine, where the front of the feed belt is further from the feed drum than the rear of the feed belt. One or more of the blower heads can blow air across the feed drum and towards the feed belt. One or more of the blower heads can blow air across the feed drum and towards the collection machine.

One or more of the plurality of blower heads can be movable. One or more of the plurality of blower heads can have an adjustable flow rate. One or more of the plurality of blower heads can have an adjustable flow velocity. One or more of the plurality of blower heads can have an adjustable flow direction. One or more of the plurality of blower heads can have an adjustable spread of flow.

The plurality of conveyor belts can include a feed belt that feeds the material towards the collection machine, a right side belt that carries the material from a right side of the harvesting head towards the feed belt, and a left side belt that carries the material from a left side of the harvesting head towards the feed belt, where the feed belt has left and right sides and a center halfway between the left and right sides. One or more right blower heads can blow air across the right side belt and towards the center of the feed belt, and one or more left blower heads can blow air across the left side belt and towards the center of the feed belt. The feed belt can have a front and a rear, where the front is further from the collection machine than the rear, and one or more front blower heads located near the front of the feed belt can blow air towards the rear of the feed belt. One or more upper blower heads can blow air across the feed drum and towards the feed belt. One or more rear blower heads can blow air across the feed drum and towards the collection machine. The one or more right blower heads can be located below the right side belt and blow air towards the center of the feed belt, and the one or more left blower heads can be located below the left side belt and blow air towards the center of the feed belt.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
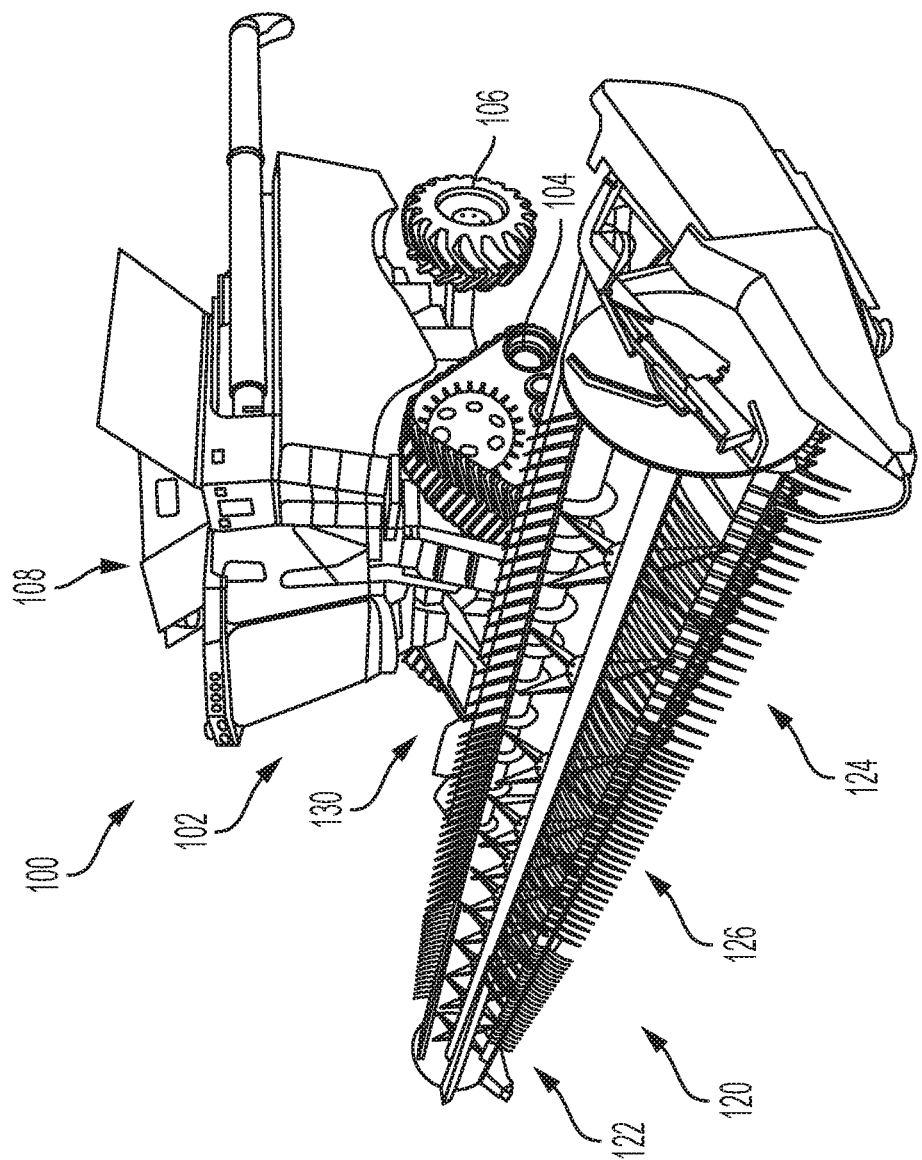
FIG. 1 illustrates an exemplary combine coupled to a harvesting head.

FIG. 1 illustrates an exemplary combine 100 coupled to a harvesting head 120. The combine 100 includes an operator cab 102, traction devices 104, 106, and a storage area 108. An engine of the combine 100 can power movement of the traction devices 104, 106 which will move the combine 100 and harvesting head 120. The harvesting head 120 has a left side 122, a right side 124 and a central portion 126. Crops cut by the left and right sides 122, 124 of the harvesting head 120 are moved to the central portion 126 where they are fed into a feed section 130 for processing and transport to the storage area 108 of the combine 100.

Figure 2:
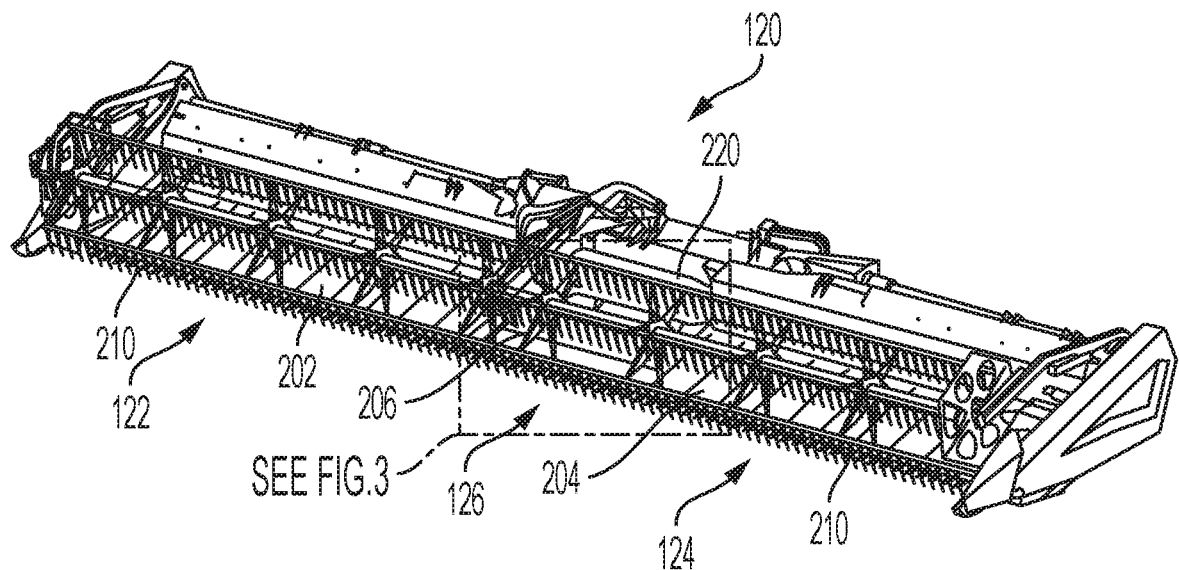
FIG. 2 illustrates closer view of the harvesting head.
Figure 3:
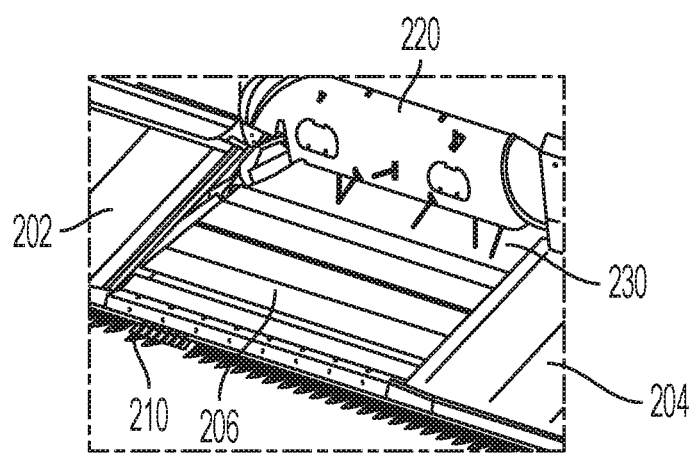
FIG. 3 illustrates a closer perspective view of the central portion of the harvesting head.

FIG. 2 illustrates a closer view of the harvesting head 120, and FIG. 3 illustrates a closer perspective view of the central portion 126 of the harvesting head 120. The entire width of the front of the harvesting head 120 can include cutting knives 210 that cut crops as the combine 100 pushes the harvesting head 120 forward through a field. The left side 122 of the harvesting head 120 includes a left conveyor belt 202 that transports crop material cut by the left side 122 of the harvesting head 120 to the central portion 126 of the harvesting head 120. The right side 124 of the harvesting head 120 includes a right belt 204 that transports crop material cut by the right side 124 of the harvesting head 120 to the central portion 126 of the harvesting head 120. The central portion 126 of the harvesting head 120 includes a feed belt 206, a feed drum 220 and a feed floor 230. The feed belt 206 feeds crop material to the feed drum 220 which compresses the material and feeds it back along the feed floor 230 into the feed section 130 of the combine 100.

At the central portion 126 of the harvesting head 120, the left conveyor belt 202 transfers the cut crop material from the left conveyor belt 202 to the feed belt 206, and the right conveyor belt 204 transfers the cut crop material from the right conveyor belt 204 to the feed belt 206, and the feed belt 206 receives crop material cut by the central portion 126 of the harvesting head 120. The feed belt 206 transports this received crop material to the feed drum 220 which rotates to feed the crop material along the feed floor 230 towards the feed section 130 of the combine.

Figure 4:
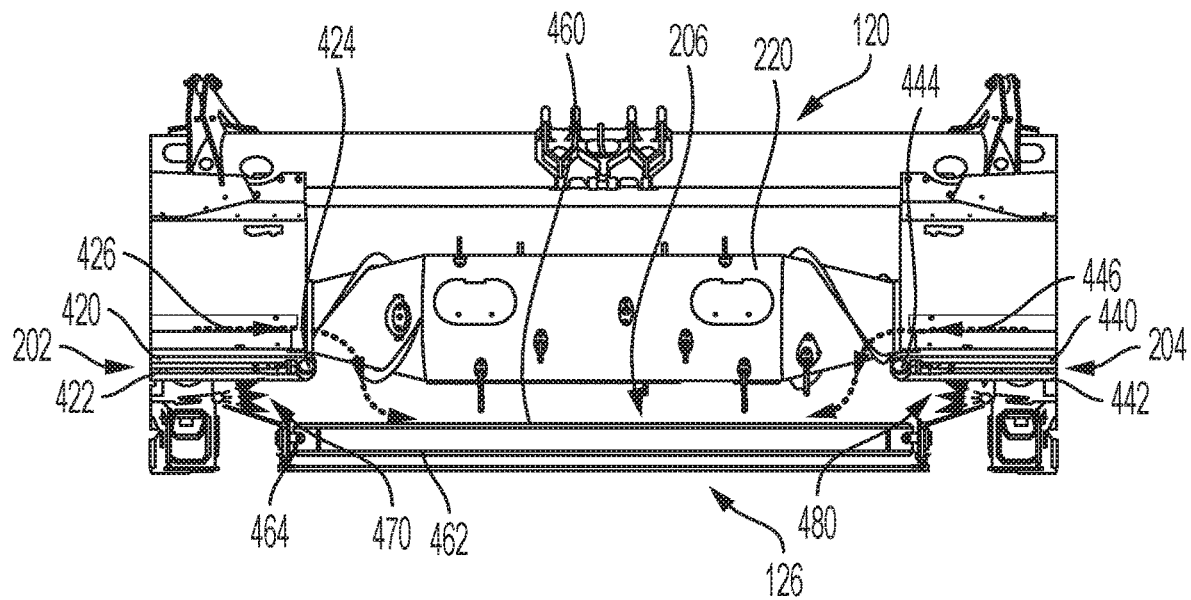
FIG. 4 illustrates a front view of the central portion of the harvesting head with left and right side blower heads.

FIG. 4 illustrates a front view of the central portion 126 of the harvesting head 120 with blower heads 470, 480. The left conveyor belt 202 includes a top portion 420, a bottom portion 422 and a left head roller 424. The right conveyor belt 204 includes a top portion 440, a bottom portion 442 and a right head roller 444. The feed belt 206 includes a top portion 460, a bottom portion 462 and a center head roller 464.

The crop material cut by the left side 122 of the harvesting head 120 generally follows the path of arrow 426. The top portion 420 of the left conveyor belt 202 transports crop material cut by the left side 122 to the central portion 126 where the left head roller 424 is positioned. The top portion 420 of the left conveyor belt 202 wraps around the left head roller 424 to become the bottom portion 422 and return to the left end of the harvesting head 120 where it will wrap around a left tail roller to become the top portion 420 of the left conveyor belt 202 and again transport crop material cut by the left side 122 of the harvesting head 120 to the central portion 126. As the top portion 420 of the left conveyor belt 202 wraps around the left head roller 424, most of the crop material being carried by the top portion 420 drops onto the top portion 460 of the feed belt 206 which transports this crop material to the feed drum 220 and feed floor 230 for deposit in the feed section 130 of the combine. Crop material that is not successfully transferred from the left conveyor belt 202 to the feed belt 206, for example by sticking to the bottom portion 422 of the left conveyor belt 202, or falling and missing the feed belt 206, can be lost. The left blower 470 can blow air under the bottom portion 422 of the left conveyor belt 202 towards the top portion 460 of the feed belt 206 to increase the amount of crop material successfully transferred from the left conveyor belt 202 to the feed belt 206 and ultimately into the feed section 130 of the combine.

The left blower 470 can also help prevent crop material being carried by the top portion 460 of the feed belt 206 from falling off the left side of the feed belt 206 to also increase the amount of crop material successfully carried by the feed belt 206 and deposited into the feed section 130 of the combine.

The crop material cut by the right side 124 of the harvesting head 120 generally follows the path of arrow 446. The top portion 440 of the right conveyor belt 204 transports crop material cut by the right side 124 to the central portion 126 where the right head roller 444 is positioned. The top portion 440 of the right conveyor belt 204 wraps around the right head roller 444 to become the bottom portion 442 and return to the right end of the harvesting head 120 where it will wrap around a right tail roller to become the top portion 440 of the right conveyor belt 204 and again transport crop material cut by the right side 124 of the harvesting head 120 to the central portion 126. As the top portion 440 of the right conveyor belt 204 wraps around the right head roller 444, most of the crop material being carried by the top portion 440 drops onto the top portion 460 of the feed belt 206 which transports this crop material to the feed drum 220 and feed floor 230 for deposit in the feed section 130 of the combine. Crop material that is not successfully transferred from the right conveyor belt 204 to the feed belt 206, for example by sticking to the bottom portion 442 of the right conveyor belt 204 or falling and missing the feed belt 206, can be lost. The right blower 480 can blow air under the bottom portion 442 of the right conveyor belt 204 towards the top portion 460 of the feed belt 206 to increase the amount of crop material successfully transferred from the right conveyor belt 204 to the feed belt 206 and ultimately into the feed section 130 of the combine. The right blower 480 can also help prevent crop material being carried by the top portion 460 of the feed belt 206 from falling off the right side of the feed belt 206 to also increase the amount of crop material successfully carried by the feed belt 206 and deposited into the feed section 130 of the combine.

There can be one or more blowers on the right and left sides of the feed belt 206 to help create and air barrier to reduce the loss of crop material falling off the sides of the feed belt 206. The blowers can be placed below the side belts 202, 204 and directed to blow along the bottom portions 422, 442 of the side belts 202, 204 towards the feed belt 206 to help reduce the amount of crop material sticking to the bottom portions 422, 442 or otherwise failing to transfer from the side belts 202, 204 to the feed belt 206. The blowers can create a curtain of air on the sides of the feed belt 206 to reduce loss as the crop material is transported to the feed drum 220 and feed floor 230 for deposit into the feed section 130 of the combine.

Figure 5:
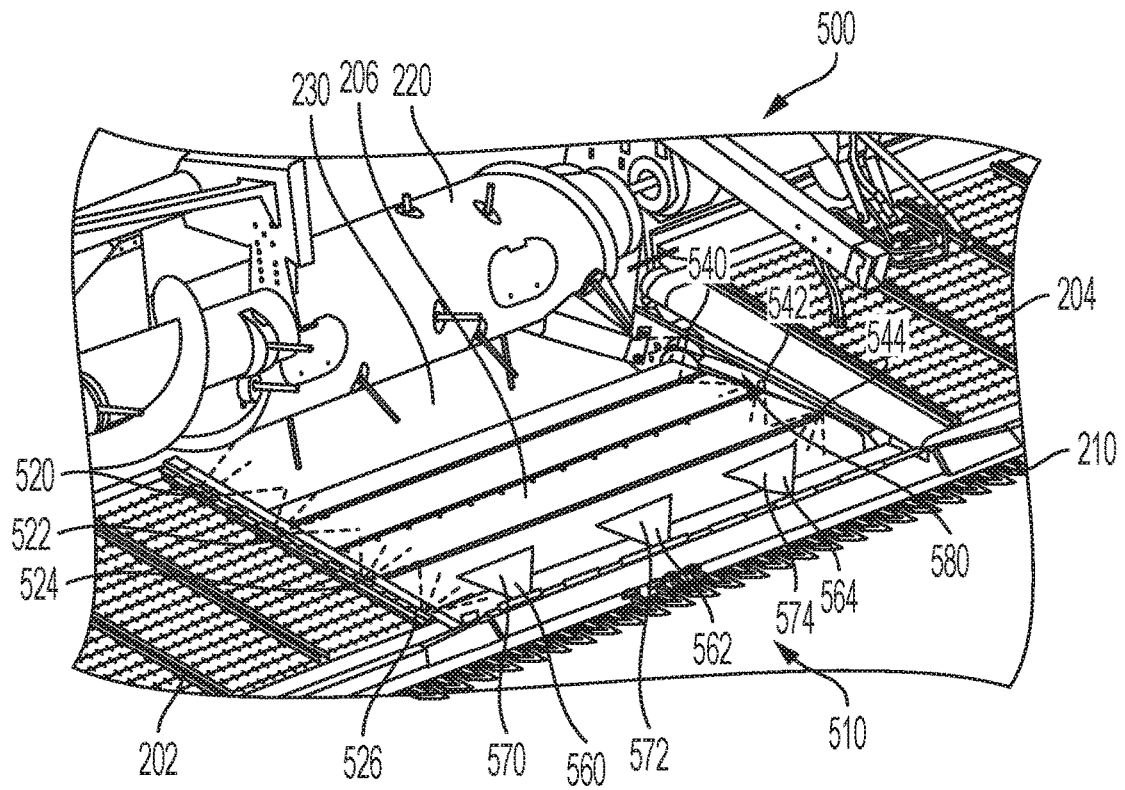
FIG. 5 illustrates a perspective view of a central portion of an embodiment of a harvesting head with left, right and front blower heads.

FIG. 5 illustrates a perspective view of a central portion 510 of an embodiment of a harvesting head 500 with a plurality of left blower heads 520-526, a plurality of right blower heads 540-544, and a plurality of front blower heads 560-564. The perspective view also shows a gap 580 between the right conveyor belt 204 and the feed belt 206. Crop material that sticks to the right conveyor belt 204 or otherwise is not successfully transferred to and kept on the feed belt 206 can fall into the gap 580 and be lost to the harvest. There is a similar gap between the left conveyor belt 202 and the feed belt 206 which is not visible from this perspective.

As described above with reference to FIG. 4, the left conveyor belt 202 transports crop material cut by the left side of the harvesting head 500 to the central portion 510 where most of the crop material being carried by the left conveyor belt 202 drops onto the feed belt 206 which transports this crop material to the feed floor 230 and the feed drum 220 for deposit in the feed section 130 of the combine. The left blower heads 520, 522, 524, 526 blow air under the left conveyor belt 202 towards the feed belt 206 to increase the amount of crop material successfully transferred from the left conveyor belt 202 to the feed belt 206, and the left blower heads 520, 522, 524, 526 also help prevent crop material from falling off the left side of the feed belt 206 into any gaps. The spacing and locations of the left blower heads 520, 522, 524, 526 can be varied to reduce loss of crop material from the feed belt 206. The flow rate, velocity, direction and/or spread of the air flow or air stream from the left blower heads 520, 522, 524, 526 can also be varied to reduce loss of crop material from the feed belt 206. The left blower heads 520, 522, 524, 526 can create a curtain of air on the left side of the feed belt 206 to reduce loss as the crop material is transported to the feed floor 230 and the feed drum 220 for deposit in the feed section 130 of the combine 100.

As described above with reference to FIG. 4, the right conveyor belt 204 transports crop material cut by the right side of the harvesting head 500 to the central portion 510 where most of the crop material being carried by the right conveyor belt 204 drops onto the feed belt 206 which transports this crop material to the feed floor 230 and the feed drum 220 for deposit in the feed section 130 of the combine. The right blower heads 540, 542, 544 blow air under the right conveyor belt 204 towards the feed belt 206 to increase the amount of crop material successfully transferred from the right conveyor belt 204 to the feed belt 206, and the right blower heads 540, 542, 544 also help prevent crop material from falling off the right side of the feed belt 206 into any gaps, for example the gap 580. The spacing and locations of the right blower heads 540, 542, 544 can be varied to reduce loss of crop material from the feed belt 206. The flow rate, velocity, direction and/or spread of the air flow or air stream from the right blower heads 540, 542, 544 can also be varied to reduce loss of crop material from the feed belt 206. The right blower heads 540, 542, 544 can create a curtain of air on the right side of the feed belt 206 to reduce loss as the crop material is transported to the feed floor 230 and the feed drum 220 for deposit in the feed section 130 of the combine.

The feed belt 206 transports crop material received from the left and right conveyor belts 202, 204 as well as crop material cut by the cutting knives 210 of the center section 510 of the harvesting head 500 to the feed floor 230 and the feed drum 220 for deposit in the feed section 130 of the combine. The front blower heads 560, 562, 564 blow air over the top of the feed belt 206 towards the feed drum 220 to help prevent crop material from backing up or falling off the front of the feed belt 206. The front blower heads 560, 562, 564 can have covers 570, 572, 574, respectively, to help direct air flow from the front blower heads 560, 562, 564 towards the feed drum 220, and reduce any interference with the feeding of crop material cut by the center section 510. The spacing and locations of the front blower heads 560, 562, 564 can be varied, and/or the flow rate, velocity, direction and/or spread of the air stream from the front blower heads 560, 562, 564 can be varied to reduce loss of crop material from the feed belt 206.

Figure 6:
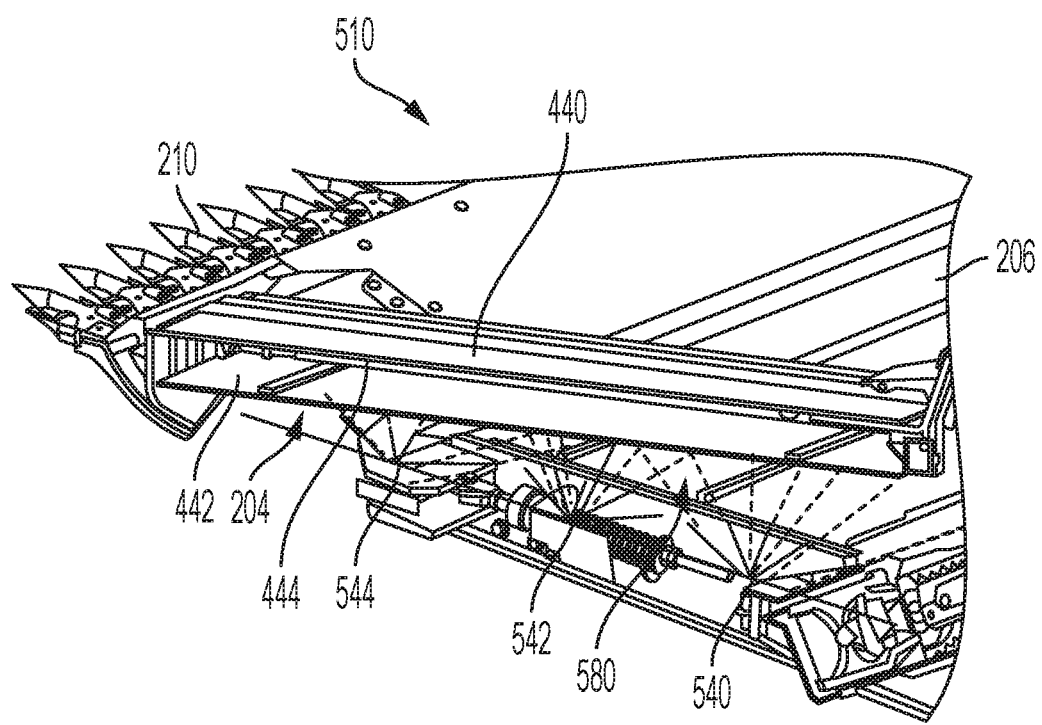
FIG. 6 illustrates a cross-section, perspective views of the right side of the center portion of the harvesting head, where the cross-section is taken near the right head roller of the right conveyor belt and is looking from the right side of the right head roller towards the feed belt.
Figure 7:
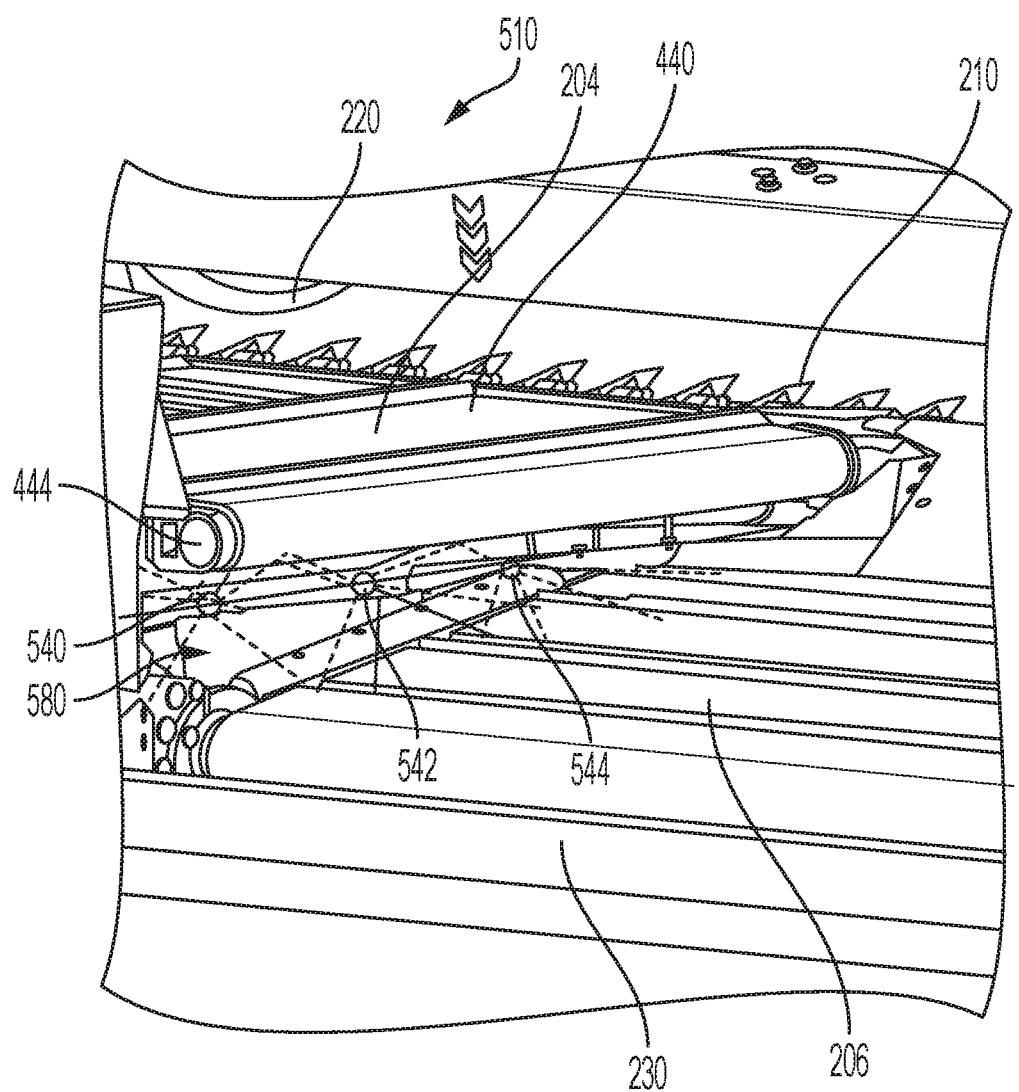
FIG. 7 illustrates a cross-section, perspective views of the right side of the center portion of the harvesting head, where the cross-section is taken near the right head roller of the right conveyor belt and is looking from the right side of the feed belt towards the right head roller.

FIGS. 6 and 7 illustrate cross-section, perspective views of the right side of the center portion 510 of the harvesting head 500, where the cross-section is taken near the right head roller 444 of the right conveyor belt 204. The perspective of FIG. 6 is looking from the right side of the right head roller 444 towards the feed belt 206. The perspective of FIG. 7 is looking from the right side of the feed belt 206 towards the right head roller 444, and more clearly shows the gap 580. FIGS. 6 and 7 illustrate the location of the right blower heads 540, 542, 546 blowing into the gap 580 below the bottom portion 442 of the right conveyor belt 204 and above the feed belt 206. The right blower heads 540, 542, 546 blow air under the right conveyor belt 204 towards the feed belt 206 to increase the amount of crop material successfully transferred from the right conveyor belt 204 to the feed belt 206, and the right blower heads 540, 542, 546 also help prevent crop material from falling off the right side of the feed belt 206 and into the gap 580. The spacing and locations, as well as the flow rate, velocity, direction and/or spread of the air stream from the right blower heads 540, 542, 546 can be varied to reduce loss of crop material from the feed belt 206.

Figure 8:
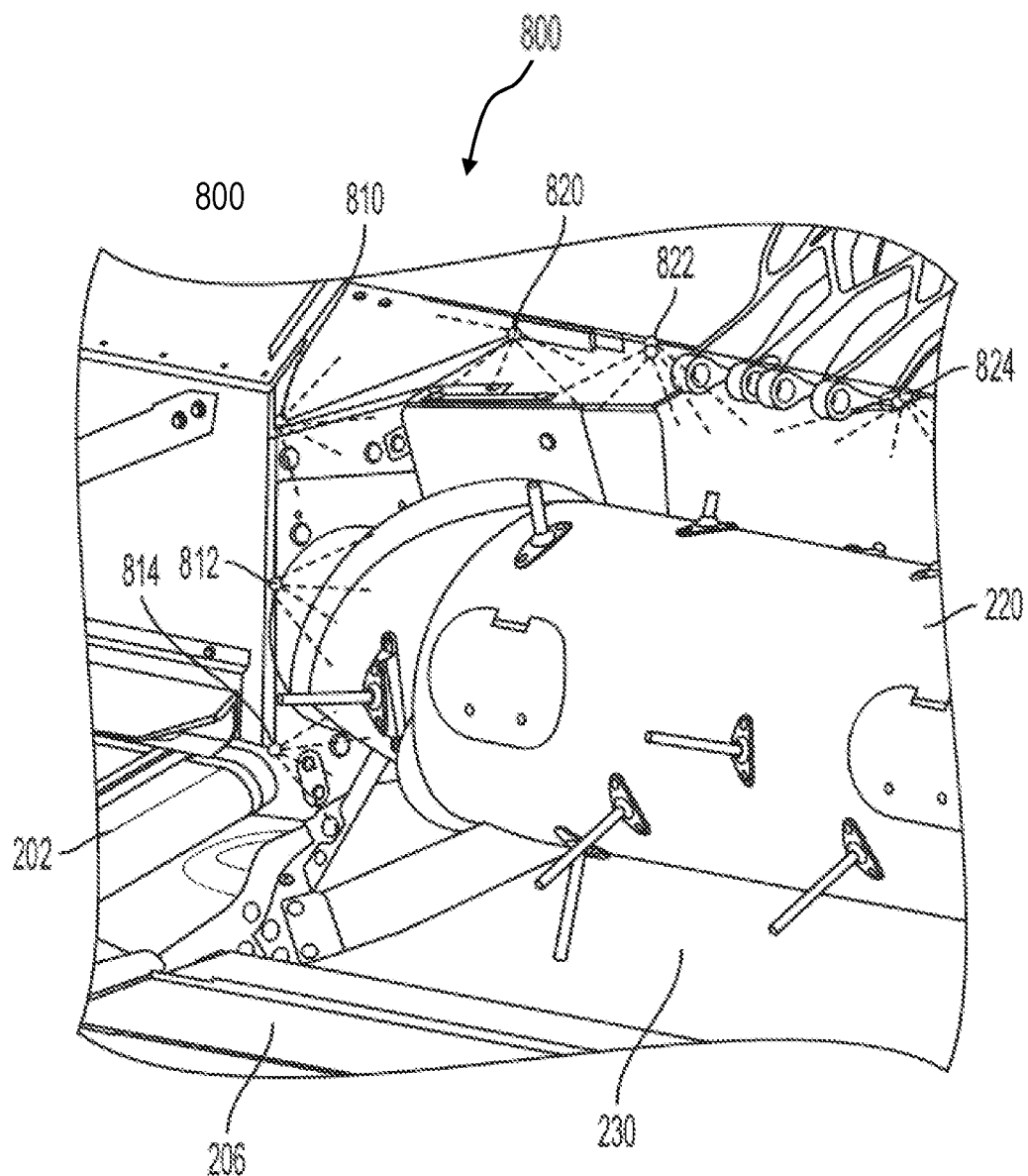
FIG. 8 illustrates a view of a harvesting head near the feed drum looking towards the combine where the harvesting head includes rear and upper blower heads.

FIG. 8 illustrates a view of a harvesting head 820 near the feed drum 220 looking towards the combine 100. The harvesting head 820 includes rear blower heads 810, 812, 814 and upper blower heads 820, 822, 824. The rear blower heads 810, 812, 814 are in front of the feed drum 220 and above the feed belt 206 and the feed floor 230. The rear blower heads 810, 812, 814 blow air towards the feed drum 220 and the feed floor 230 to help move the grain towards the feed section 130 of the combine 100. The upper blower heads 820, 822, 824 are above the feed drum 220 and the feed floor 230. The upper blower heads 820, 822, 824 blow air down over the feed drum 220 and towards the feed floor 230 to help keep grain moving towards the feed section 130 of the combine 100. The spacing and locations, as well as the flow rate, velocity, direction and/or spread of the air streams from the rear blower heads 810, 812, 814 and the upper blower heads 820, 822, 824 can be varied to reduce loss of crop material as it is moved towards the feed section 130 of the combine 100.

The blower heads or nozzles can be removable, movable or permanently fixed at various locations on the harvesting head. The air flow or air stream setting (flow rate, velocity, direction and/or spread) can be variable such that it will form an air curtain at the side of the feed belt and will blow primarily the grains towards the center of the belt. The nozzle spacing can be variable such that the air curtain formed by the one or more blower nozzles will cover all or a desired portion of the areas with possible losses of grain. The nozzles can create an air curtain to cover the area between center belts and side belts of the head; and can be located below the side belts and focus the air stream on the top of the center belts. The strength and trajectory of the air flow or air stream from the nozzles can be constant or variable.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A harvesting head for a collection machine that harvests and stores material; the harvesting head comprising:
a plurality of conveyor belts configured to transport the material towards the collection machine, the plurality of conveyor belts including a feed belt that feeds the material towards the collection machine, and a first side belt that carries the material towards the feed belt; and
a plurality of blower heads configured to keep the material on the plurality of conveyor belts as the material is transported towards the collection machine;
wherein the first side belt has a bottom portion and a top portion;
wherein the feed belt has a top portion and a bottom portion; and
wherein one or more first side blower heads of the plurality of blower heads are located below the first side belt and blows air across the bottom portion of the first side belt towards the top portion of the feed belt to blow the material stuck to the bottom portion of the first side belt onto the top portion of the feed belt.

2. The harvesting head of claim 1, wherein the feed belt has two sides and a center halfway between the two sides; and
wherein the one or more first side blower heads blows air across the bottom portion of the first side belt towards the center of the top portion of the feed belt.

3. The harvesting head of claim 1, wherein the feed belt has a front and a rear, the front being further from the collection machine than the rear; and
wherein one or more front blower heads of the plurality of blower heads are located near the front of the feed belt and blow air across the top portion of the feed belt towards the rear of the feed belt.

4. The harvesting head of claim 1, further comprising:
a feed drum configured to rotate and move the material towards the collection machine;
wherein one or more upper blower heads of the plurality of blower heads blow air across the feed drum and towards the feed belt.

5. The harvesting head of claim 1, further comprising:
a feed drum configured to rotate and move the material towards the collection machine;
wherein one or more rear blower heads of the plurality of blower heads blow air across the feed drum and towards the collection machine.

6. The harvesting head of claim 1, wherein the plurality of conveyor belts includes a second side belt that carries the material from a right side of the harvesting head towards the feed belt, and wherein the second side belt has a bottom portion and a top portion;
wherein the first side belt carries the material from a left side of the harvesting head towards the feed belt;
wherein the feed belt has left and right sides and a center halfway between the left and right sides; and
wherein one or more second side blower heads of the plurality of blower heads are located below the second side belt and blow air across the bottom portion of the second side belt towards the right side of the top portion of the feed belt to blow the material stuck to the bottom portion of the second side belt onto the top portion of the feed belt, and the one or more first side blower heads of the plurality of blower heads blow air across the bottom portion of the first side belt towards the left side of the top portion of the feed belt.

7. The harvesting head of claim 6, wherein the feed belt has a front and a rear, the front being further from the collection machine than the rear; and
wherein one or more front blower heads of the plurality of blower heads are located near the front of the feed belt and blow air towards the rear of the feed belt.

8. The harvesting head of claim 7, further comprising:
a feed drum configured to rotate and move the material from the rear of the feed belt towards the collection machine; and
wherein one or more upper blower heads of the plurality of blower heads blow air across the feed drum and towards the feed belt.

9. The harvesting head of claim 8, wherein one or more rear blower heads of the plurality of blower heads blow air across the feed drum and towards the collection machine.

10. The harvesting head of claim 7, further comprising:
a feed drum configured to rotate and move the material from the rear of the feed belt towards the collection machine; and
wherein one or more rear blower heads of the plurality of blower heads blow air across the feed drum and towards the collection machine.

11. The harvesting head of claim 6, wherein the one or more second side blower heads blow air across the bottom portion of the second side belt towards the center of the top portion of the feed belt, and the one or more first side blower heads blow air across the bottom portion of the first side belt towards the center of the top portion of the feed belt.

12. The harvesting head of claim 11, wherein the feed belt has a front and a rear, the front being further from the collection machine than the rear; and
wherein one or more front blower heads of the plurality of blower heads are located near the front of the feed belt and blow air towards the rear of the feed belt.

13. The harvesting head of claim 12, further comprising:
a feed drum configured to rotate and move the material from the rear of the feed belt towards the collection machine; and
wherein one or more upper blower heads of the plurality of blower heads blow air across the feed drum and towards the feed belt.

14. The harvesting head of claim 13, wherein one or more rear blower heads of the plurality of blower heads blow air across the feed drum and towards the collection machine.

15. The harvesting head of claim 12, further comprising:
a feed drum configured to rotate and move the material from the rear of the feed belt towards the collection machine; and
wherein one or more rear blower heads of the plurality of blower heads blow air across the feed drum and towards the collection machine.

* * * * *